US012610059B2

(12) United States Patent
Edpalm et al.

(10) Patent No.: US 12,610,059 B2
(45) Date of Patent: Apr. 21, 2026

(54) METHOD AND A DEVICE FOR MANAGING ENCODED IMAGE FRAMES IN A DATA BUFFER

(71) Applicant: Axis AB, Lund (SE)

(72) Inventors: Viktor Edpalm, Lund (SE); Johan Palmaeus, Lund (SE); Alexander Toresson, Lund (SE)

(73) Assignee: Axis AB, Lund (SE)

( * ) Notice: Subject to any disclaimer, the term of this patent is extended or adjusted under 35 U.S.C. 154(b) by 195 days.

(21) Appl. No.: 18/503,393

(22) Filed: Nov. 7, 2023

(65) Prior Publication Data

US 2024/0163456 A1 May 16, 2024

(30) Foreign Application Priority Data

Nov. 16, 2022 (EP) .................................... 22207673

(51) Int. Cl.
*H04N 19/159* (2014.01)
*H04N 19/172* (2014.01)
*H04N 19/177* (2014.01)

(52) U.S. Cl.
CPC ......... *H04N 19/159* (2014.11); *H04N 19/172* (2014.11); *H04N 19/177* (2014.11)

(58) Field of Classification Search
None
See application file for complete search history.

(56) References Cited

U.S. PATENT DOCUMENTS

| | | | |
|---|---|---|---|
| 4,982,285 A | 1/1991 | Sugiyama | |
| 9,813,732 B2 | 11/2017 | Lundberg | |
| 10,567,796 B2 | 2/2020 | Shen et al. | |
| 2008/0117926 A1* | 5/2008 | Bassali | H04L 47/50 |
| | | | 370/412 |

(Continued)

FOREIGN PATENT DOCUMENTS

| | | |
|---|---|---|
| CA | 2786200 A1 | 8/2012 |
| EP | 3070695 A1 | 9/2016 |
| EP | 3376766 A1 | 9/2018 |

OTHER PUBLICATIONS

Isovic, D. "Quality aware MPEG-2 stream adaptation in resource constrained systems" (Proceedings of the Euromicro Conference on Real-Time Systems, (2004). (Year: 2004).*

(Continued)

*Primary Examiner* — Kaitlin A Retallick
(74) *Attorney, Agent, or Firm* — Volpe Koenig

(57) ABSTRACT

An improved method of managing encoded image frames in a data buffer is presented. Encoded image frames are buffered, for example in a pre-event buffer, in such a way that all stored, e.g., buffered, encoded image frames can be retrieved from the data buffer as a decodable video sequence and such that only those encoded image frames needed for obtaining a decodable video sequence having a pre-defined recording time may be stored in the data buffer. This may be referred to as pruning the data buffer in such a way that all stored encoded image frames can be retrieved from the data buffer as a decodable video sequence having a pre-defined recording time. Thereby, only the encoded image frames needed for generating the video sequence may be stored in the data buffer. Consequently, no extra space for storage of an extra GOP is needed in the data buffer.

16 Claims, 5 Drawing Sheets

(56)        References Cited

U.S. PATENT DOCUMENTS

2008/0232468 A1    9/2008 Kwon et al.
2016/0277759 A1*   9/2016 Edpalm ................. G08B 25/08
2018/0270482 A1    9/2018 Edpalm et al.
2022/0174335 A1*   6/2022 Chinnaiyan ...... H04N 21/44004

OTHER PUBLICATIONS

Hikvision codec H265(+) Encoding Technology Brochure (2017).
Furini, M. "Real-Time traffic transmissions over the internet" Paper, IEEE, (2001).
Isovic, D. "Quality aware MPEG-2 stream adaptation in resource constrained systems" (Proceedings of the Euromicro Conference on Real-Time Systems, (2004).
Extended European Search Report issued on Mar. 15, 2023 for European Patent Application No. 22207673.9.
Communication Pursuant to Article 94(3) EPC issued on Jan. 12, 2024 for European Patent Application No. 22207673.9.

* cited by examiner

Pre-event sequence
(buffer)    Event start    Event end    Post-event sequence

SEQ1    SEQ2

200

208

202

Radio
Link 210    204    206

216

212

214

400

METHOD AND A DEVICE FOR MANAGING ENCODED IMAGE FRAMES IN A DATA BUFFER

TECHNICAL FIELD

The present invention relates to a device and a method for managing encoded image frames in a data buffer.

BACKGROUND

The use of video surveillance in different applications is steadily increasing. Surveillance or monitoring cameras may for example be used for crime prevention and traffic monitoring, and monitoring cameras may be mounted in shopping malls, at retail stores, private homes, vehicles and roads, and so-called body worn cameras (BWC) may be worn by for example police officers and guards.

Usually, the monitoring camera captures image frames of a scene over time, thereby obtaining a temporal sequence of image frames. The temporal sequence of image frames may be referred to as a video sequence. Before the video sequence is stored in a storage or transmitted to a receiver over a communications network, the video sequence is compressed to reduce its size. The compression may be performed by various video encoding methods. In many digital video encoding systems, two main modes are used for compressing the image frames of the video sequence: intra frame/mode coding and inter frame/mode coding.

In the intra mode coding, the image frames are encoded by exploiting the spatial redundancy of the pixels within the image frame itself via prediction, transform, and entropy coding. The encoded image frames in intra mode are referred to as intra-frames, I-frames or key frames.

The inter mode coding exploits the temporal redundancy between separate image frames and relies on a motion-compensation prediction technique that predicts parts of an image frame from one or more other image frames by encoding the motion in pixels from one image frame to another for selected blocks of pixels. The encoded image frames in inter mode are referred to as inter-frames and may be P-frames or B-frames. The P-frames are forward-predicted frames coded based on a forward prediction from a previous I- or P-frame. The B-frames however are bi-directionally predicted frames coded based on a forward prediction from a previous I- or P-frame, as well as a backward prediction from a succeeding I- or P-frame. Thus, the B-frames are based both on preceding and succeeding image frames, while the P-frames only are based on a preceding frame. Some encoding systems also use another kind of inter-frame, which is sometimes referred to as an inter-refresh frame or just refresh-frame, or R-frame. This kind of inter-frame may also be referred to as a fast forward frame, or F-frame. Different from a P-frame, an F-frame does not use the nearest preceding decoded P-frame as reference image frame but refers back to the nearest preceding intra-frame.

The encoded image frames are arranged in groups of pictures, or GOPs for short, where a GOP may comprise of a fix number of pictures, i.e., a fix number of image frames, or, when using the concept of dynamic GOP, a GOP may comprise a varying number of image frames. Each group of pictures is started by an intra-frame, which does not refer to any other image frame. The intra-frame is followed by a number of inter-frames, which do refer to other image frames. Image frames do not necessarily have to be encoded and decoded in the same order as they are captured or displayed. The only inherent limitation is that for an image frame to serve as reference frame, it has to be decoded before the image frame that is to use it as reference can be encoded. In surveillance or monitoring applications, encoding is generally done in real time, meaning that the most practical approach is to encode and decode the image frames in the same order as they are captured and displayed, as there will otherwise be undesired latency.

Recording of video sequences, particularly in monitoring or surveillance applications, may be based on one or more event triggers, e.g., a motion detection event trigger triggered upon detection of a motion within the monitored area. In this manner, recording may be initiated when an event occurs, such as when movement occurs in a previously static scene or when a fire alarm or a burglary alarm is triggered. When recording is based on event triggers, it is oftentimes useful to also record a video sequence captured before the event was triggered. Such a video sequence is herein referred to as a pre-event video sequence. For instance, if recording is triggered by a person moving in a region of interest representing a part of the monitored scene, it may be of interest to also record a video sequence showing how the person moved in, e.g., entered, the region of interest before the event was triggered since such a video sequence may have evidence value. In order to be able to record a pre-event video sequence when an event occurs, encoded image frames may be continuously buffered in a buffer, such as a first-in-first-out (FIFO) buffer. When the FIFO buffer is full, the oldest buffered encoded image frame is overwritten with the latest encoded image frame. Upon an event trigger, buffered encoded image frames are retrieved from the FIFO buffer and transmitted or transferred to a recorder, such that the retrieved encoded image frames can be recorded preceding a video sequence that starts at the event. Recording may then be continued during the event and during a predetermined time after the event has passed. Alternatively, recording may continue until an event trigger representing a stop recording event has been received. The length of time of the pre-event video sequence may be set by a user.

FIG. 1 schematically illustrates a sequence of I- and P-frames captured by a monitoring camera. In the figure, the letter I denotes an I-frame and the letter P denotes a P-frame. FIG. 1 also illustrates when an event started and when the event ended. The start of the event may be when a motion alarm is triggered, and the end of the event may be when the motion alarm has been acknowledged by an operator. However, the end of the event does not have to be associated with an action taken by the operator. Instead, the end of the event could be considered to occur a predefined time period after the event was triggered or a predefined time period after the termination of the detected motion. The pre-event video sequence of image frames captured by the monitoring camera before the start of the event, may be temporarily stored in the FIFO buffer. Since the buffer stores the pre-event video sequence of image frames, the buffer is sometimes referred to as a pre-event buffer. When the event starts, the pre-event video sequence of image frames is retrieved from the buffer, and the retrieved pre-event video sequence is combined with a video sequence of image frames captured from the start of the event and onwards. Thus, the combined video sequence of image frames may in addition to the pre-event video sequence comprise an event video sequence comprising a video sequence of image frames captured during the event and a post-event video sequence comprising a video sequence of image frames captured after the event has ended. The combined video sequence of image frames may for example be displayed to an operator and/or recorded permanently in a memory for later replay and investigation.

Some monitoring cameras may continuously capture image frames but only record them upon an event trigger while other monitoring cameras only capture image frames and record them upon an event trigger. The first mentioned type of monitoring cameras, usually store the captured image frames to a FIFO buffer for a possible later recording of them in a memory. The storage in the FIFO buffer is to be seen as a temporary storage as compared to the recording in the memory which is a more permanent storage. Since the buffer is a FIFO buffer, the oldest image frame in the FIFO buffer will be overwritten with the latest captured image frame when the buffer is full. Usually, a user decides the time length of the pre-event video sequence of encoded image frames to be buffered in the buffer. For example, it may be of interest to be able to record and/or display a video sequence starting 3 seconds before the event was triggered. This period of time is sometimes referred to as a pre-event recording time and in the given example the pre-event recording time is 3 seconds. In order to be able to decode and view these 3 seconds of encoded image frames, the buffered pre-event video sequence has to start with an I-frame. However, it may very well happen that the first image frame in those 3 seconds is a P-frame, as exemplified in FIG. 1. Since a P-frame does not contain all necessary data without the I-frame with reference to which the P-frame was encoded, the decoding of the pre-event video sequence cannot start at the P-frame. In order to guarantee that there will be at least 3 seconds of decodable pre-event video, capacity for an extra sequence of encoded image frames corresponding to one GOP is added to the buffer as is described in US 2016/277759 A1. The actual time length of the encoded image frames stored in the pre-event buffer will therefore depend on the pre-event recording time chosen by the user, on the current frame rate and on the GOP length. For instance, with a user set pre-event recording time of 3 seconds, a frame rate of 30 fps and a GOP length of 128 image frames, the total time of buffered pre-event video sequence in the pre-event buffer would be 7.3 seconds (3 seconds+128/30 seconds). Thus, in this example the total time of the needed pre-event video sequence buffered in the pre-event buffer is more than twice as long as the desired pre-event recording time. Thus, since an additional GOP always is needed, the total time of the pre-event video sequence needed to be buffered in the pre-event buffer is always longer than the desired pre-event recording time. This is a drawback when trying to optimize the storage usage of the buffer, and especially when trying to optimize the buffering of encoded image frames to only those needed for providing the pre-event video sequence having the desired pre-event recording time. Further, since the GOP length may vary and as the length of the pre-event video sequence varies based on the GOP length, the pre-event buffer must be able to retain pre-event video sequences of varying length in order to ensure that a decodable pre-event video sequence of the pre-event recording time can be retrieved from the buffer. As a safe measure, the pre-event buffer may be configured to be able to buffer a pre-event video sequence that comprises an extra GOP having the longest GOP length in addition to the pre-event video sequence of the desired length. Hence, there is a need for an improved buffering of encoded image frames. Especially, there is a need for an improved managing of encoded image frames buffered in a data buffer.

ISOVIC D ET AL: "Quality aware MPEG-2 stream adaptation in resource constrained systems" (PROCEED-INGS OF THE EUROMICRO CONFERENCE ON REAL-TIME SYSTEMS, 1 Jan. 2004 (2004 Jan. 1), pages 23-32, XP002447140) describes a method for MPEG decoding under limited resources wherein frame skipping is applied to an MPEG stream to achieve a tailored MPEG stream comprising only frames that can be guaranteed to be decoded and displayed in time.

CA 2 786 200 A1 discloses capacity and spectrum constrained multiple-access communication systems that optimize performance by selectively discarding packets. Packets are prioritized and discard decisions are made based on the prioritization.

SUMMARY OF THE INVENTION

In view of the above, it is thus an object of the present invention to mitigate drawbacks with the prior art and to provide an improved buffering of encoded image frames. Especially, an object is to manage encoded image frames in a data buffer, e.g. a pre-event buffer, in such a way that all stored, e.g., buffered, encoded image frames can be retrieved from the data buffer as a decodable video sequence and in such a way that only those encoded image frames needed for obtaining a decodable video sequence having a pre-defined recording time may be stored in the data buffer. This may be referred to as pruning the data buffer in such a way that all stored encoded image frames can be retrieved from the data buffer as a decodable video sequence having a pre-defined recording time. Thereby, only the encoded image frames needed for generating the video sequence may be stored in the data buffer. Consequently, no extra space for storage of an extra GOP is needed in the data buffer.

An aspect of the object is to select which one or more stored encoded image frames to delete when the data buffer is full in order to be able to store new encoded image frames. If a "wrong" encoded image frame, i.e., a referenced image frame used as a reference for one or more other encoded image frames, is deleted from the data buffer, these one or more other encoded image frames will not be decodable and thus it will not be possible to retrieve from the data buffer a decodable video sequence comprising all the buffered encoded image frames.

The invention is defined by the appended claims.

According to a first aspect of the invention, the above object is achieved by a method for managing encoded image frames in a pre-event buffer, wherein the encoded image frames depict a scene, wherein the pre-event buffer is configured to temporarily store encoded image frames, which stored encoded image frames, when an event in, or relating to, the scene is detected, constitute a video sequence captured before the event. The method comprises obtaining an input stream of encoded image frames depicting the scene and being arranged in groups of pictures (GOPs), each GOP comprising a single intra-frame, and two or more frame subgroups. Each frame subgroup comprises a single directly encoded inter-frame encoded with a direct reference to the intra-frame, and zero or more indirectly encoded inter-frames encoded with an indirect reference to the intra-frame via the single directly encoded inter-frame. Further, the method comprises determining whether or not a buffer fullness requirement is fulfilled, wherein the buffer fullness requirement is a buffer time requirement that is fulfilled when a total recording time of the stored encoded image frames is equal to a pre-defined recording time or will become larger than the pre-defined recording time if one or more encoded image frames of the obtained input stream are stored. When the buffer fullness requirement is unfulfilled, the method comprises storing, in the pre-event buffer, one or more encoded image frames comprised in the obtained input stream until the buffer fullness requirement is fulfilled. When the buffer fullness requirement is fulfilled, the method comprises selecting, from encoded image frames stored in the data buffer, one or more encoded image frames to be removed from the data buffer. The selected one or more encoded image frames is at least one out of: a non-referenced encoded image frame, wherein the non-referenced encoded image frame is an encoded image frame not being used as a reference image frame for any of the stored encoded image frames; and a frame subgroup out of the two or more frame subgroups. Furthermore, the method comprises removing the selected one or more encoded image frames from the pre-event buffer and storing, in the pre-event buffer, one or more encoded image frames comprised in the obtained input stream. Thereby managing the encoded image frames temporarily stored in the pre-event buffer to be only those encoded image frames constituting a decodable video sequence having the pre-defined recording time.

The term "intra-frame" when used in this disclosure should be understood as an intra-coded image frame, i.e., as an image frame encoded using an intra-mode encoding without a reference to another image frame. The intra-frame may be referred to as an I-frame or key frame.

The term "inter-frame" when used in this disclosure should be understood as an inter-coded image frame, i.e., as an image frame encoded using an inter-mode encoding with a reference to at least one other image frame. The image frame used as a reference frame when encoding another image frame is herein referred as a "reference/referenced image frame", and an encoded image frame not used as a reference is herein referred to as a "non-referenced encoded image frame".

The term "directly encoded inter-frame" should be understood as an inter-frame that is encoded with a direct reference to an intra-frame.

The term "indirectly encoded inter-frame" when used in this disclosure should be understood as an inter-frame encoded with an indirect reference to the intra-frame via a directly encoded inter-frame. Thus, the indirectly encoded inter-frame may be encoded with a direct reference to the directly encoded inter-frame being encoded with a direct reference to the intra-frame. In other words, the indirectly encoded inter-frame may be encoded with an indirect reference to the intra-frame via the directly encoded inter-frame. To decode the indirectly encoded inter-frame, both the directly encoded inter-frame to which the indirectly encoded inter-frame refers and the intra-frame to which the directly encoded inter-frame refers are needed. Alternatively, the indirectly encoded inter-frame may be encoded with a direct reference to a preceding indirectly encoded inter-frame.

The term "a non-referenced encoded image frame" when used herein should be understood as an encoded image frame not being used as a reference image frame for any of the encoded image frames stored in the data buffer.

By managing encoded image frames in the pre-event buffer, such as pruning the pre-event buffer by removing one or more stored encoded image frames from the pre-event buffer when the pre-event buffer is full as suggested by the invention, new encoded image frames can continuously be stored in the pre-event buffer and all stored encoded image frames can be retrieved from the pre-event buffer as a decodable video sequence. Preferably, the size of the pre-event buffer, e.g., measured in number of frames or seconds of video sequence, is adapted for storage of only those encode image frames needed for obtaining a decodable video sequence having a pre-defined recording time. As will be described herein, all stored encoded image frames may be retrieved when an event has occurred in order to replay what happened before the event occurred. In such case, the decodable video sequence having the pre-defined recording time may be referred to as a decodable pre-event video sequence having a pre-defined pre-event recording time.

Further, by storing, in the pre-event buffer, one or more encoded image frames comprised in the obtained input stream of encoded image frames arranged in GOPs, wherein each GOP comprises a single intra-frame, and two or more frame subgroups, and wherein each frame subgroup comprises a single directly encoded inter-frame encoded with a direct reference to the intra-frame, and zero or more indirectly encoded inter-frames encoded with an indirect reference to the intra-frame via the single directly encoded inter-frame, it is possible to select and remove from the pre-event buffer, one or more encoded image frames without affecting the ability to decode the remaining encoded image frames stored in the pre-event buffer.

Thus, a benefit with the present invention is that it is possible to store, in the pre-event buffer, only those encoded image frames needed for obtaining a decodable video sequence having the pre-defined recording time.

According to a second aspect of the invention, the above object is achieved by a device for managing encoded image frames in a pre-event buffer, wherein the encoded image frames depict a scene, wherein the pre-event buffer is configured to temporarily store encoded image frames, which stored encoded image frames, when an event in, or relating to, the scene is detected, constitute a video sequence captured before the event. The device comprises an obtaining module configured to obtain an input stream of encoded image frames depicting the scene and being arranged in groups of pictures (GOPs), each GOP comprising a single intra-frame, and two or more frame subgroups. Each frame subgroup comprises a single directly encoded inter-frame encoded with a direct reference to the intra-frame, and zero or more indirectly encoded inter-frames encoded with an indirect reference to the intra-frame via the single directly encoded inter-frame. The device further comprises a determining module configured to determine whether or not a buffer fullness requirement is fulfilled, wherein the buffer fullness requirement is a buffer time requirement that is fulfilled when a total recording time of the stored encoded image frames is equal to a pre-defined recording time or will become larger than the pre-defined recording time if one or more encoded image frames of the obtained input stream are stored. The device comprises a storing module configured to, when the buffer fullness requirement is unfulfilled, store one or more encoded image frames comprised in the obtained input stream in the pre-event buffer until the buffer fullness requirement is fulfilled. Furthermore, the device comprises a selecting module configured to, when the buffer fullness requirement is fulfilled, select, from the stored encoded image frames, one or more encoded image frames to be removed from the pre-event buffer. The selected one or more encoded image frames is at least one out of a non-referenced encoded image frame, wherein the non-referenced encoded image frame is an encoded image frame not being used as a reference image frame for any of the stored encoded image frames; and a frame subgroup out of the two or more frame subgroups. Yet further, the device comprises a removing module configured to remove the selected one or more encoded image frames from the pre-event buffer and the storing module being configured to store, in the pre-event buffer, one or more encoded image frames comprised in the obtained input stream.

According to a third aspect of the invention, the above object is achieved by a non-transitory computer-readable medium having stored thereon computer code instructions adapted to carry out the method of the first aspect when executed by a device having processing capability.

The second and third aspects may generally have the same features and advantages as the first aspect. Embodiments of the invention are defined in the appended dependent claims. It is further noted that the invention relates to all possible combinations of features disclosed herein unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

The present invention will be described more fully hereinafter with reference to the accompanying drawings, in which embodiments of the invention are shown.

Figure 1:
FIG. 1 schematically illustrates an event video sequence according to prior art.
Figure 2A:
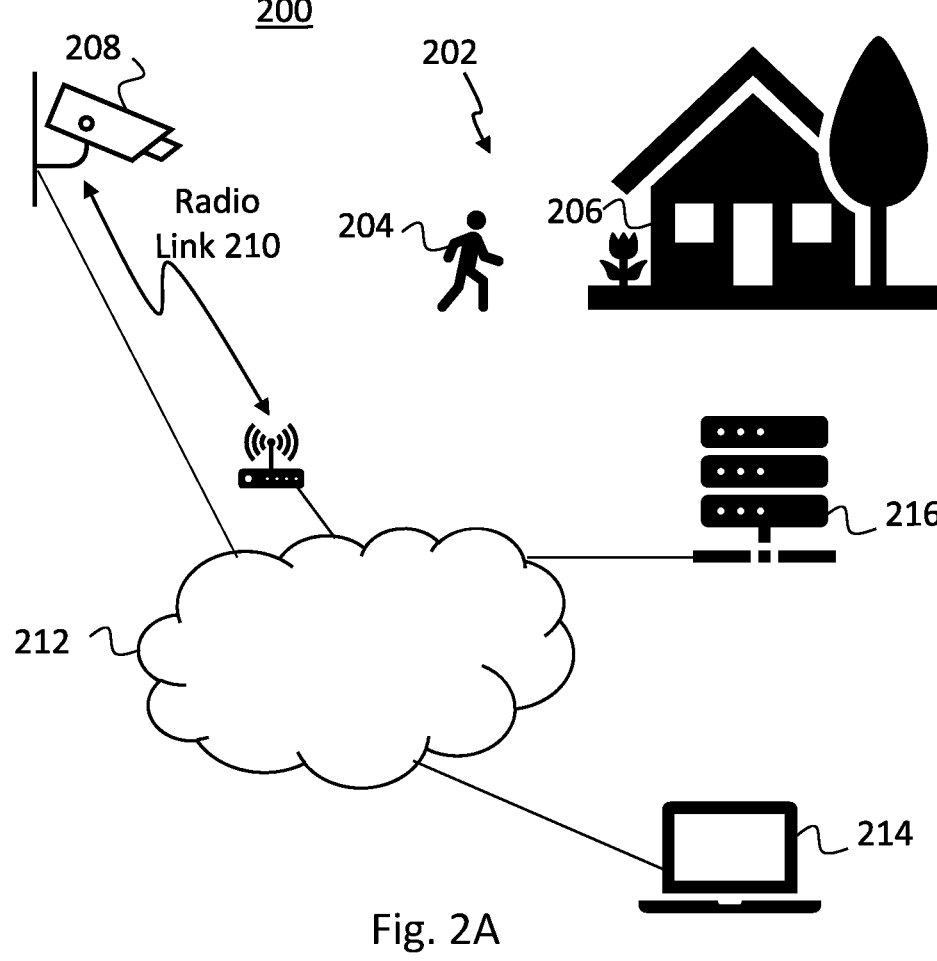
FIG. 2A schematically illustrates an exemplary environment in which various embodiments of the invention can be implemented.

FIG. 2A shows a schematic diagram of an exemplary environment 200 in which various embodiments of the invention can be implemented. As can be seen in FIG. 2A, a scene 202 with an object 204, e.g., a person walking towards a building 206 is captured by a camera 208. It should be noted that the depiction of the scene 202 is merely a simplistic view for illustrative purposes. A scene 202 can be described, in a more general sense as any three-dimensional physical space whose size and shape are defined by the field of view of a camera monitoring the scene. The camera 208 may be a monitoring camera, sometimes also referred to as surveillance camera. Further, the camera may be a fixed camera, e.g., a stationary camera, a movable camera, e.g., a pan, tilt and zoom (PTZ) camera, or a body worn camera (BWC). The camera 208 may be a visible light camera, a thermal camera, or a camera combining visible light and thermal imaging methods. Further, the camera 208 may be arranged to monitor an area external to the building such as in front of a door of the building, an area within a building or an area in a scene in front of a person wearing the camera 208, just to give some examples.

As illustrated in FIG. 2A, the camera 208 is configured to transmit the video streams directly over a network, such as directly over a wired network 212 or wirelessly over a radio link 210 to the wired network 212, and eventually to a client 214 and/or a server 216, which may be connected to the network 212. It should be understood that there are many combinations of wireless and wired transmission models that can be used, and that FIG. 2A only illustrates one example. Further, in this disclosure the terms "stream" and "sequence", as for example in "video stream", "video sequence", "stream of image frames" and "sequence of image frames", are used interchangeably.

The client 214 may be a control station provided with an input device and a display so an operator can input control commands to the camera 208 and view images and/or video sequences from the camera 208. The server 216 may be a video managing system where the images and/or video sequences can be stored and/or processed further. Typically, the client 214 is also connected to the server 216.

Usually, the camera 208 continuously captures and encodes a video sequence of image frames of the scene and buffers, i.e., temporarily stores, the video sequence of encoded image frames in a data buffer, but only performs recording of the buffered video sequence into a more permanent memory as compared to the data buffer, when an event in the scene or an event relating to the scene is detected and when such a detected event triggers recording. The detected event may by a detected motion or a detected sound in the scene, a triggering of an alarm, e.g., a burglary alarm or a fire alarm, associated with the monitored scene. For example, the event may be detected by a video analysis module (not shown) comprised in the camera 208 and configured to detect motion and/or sound in a video sequence captured by the camera 208. The video analysis module may comprise an image analysis module and an audio analysis module configured to detect motion and sound, respectively, in the video sequence. As another example, an event may be detected by an external sensor, such as a door contact, a smoke detector or a passive infrared (PIR) sensor, communicatively connected to the camera 208. An event may also be a user input event such as an input of a command. For example, the event may be detected by registering an activation of a recording button on a body worn camera.

Following an event detection, an event notification may be transmitted to a receiving module. As will be described below, the receiving module may be comprised in a device for managing encoded image frames in a data buffer.

Figure 2B:
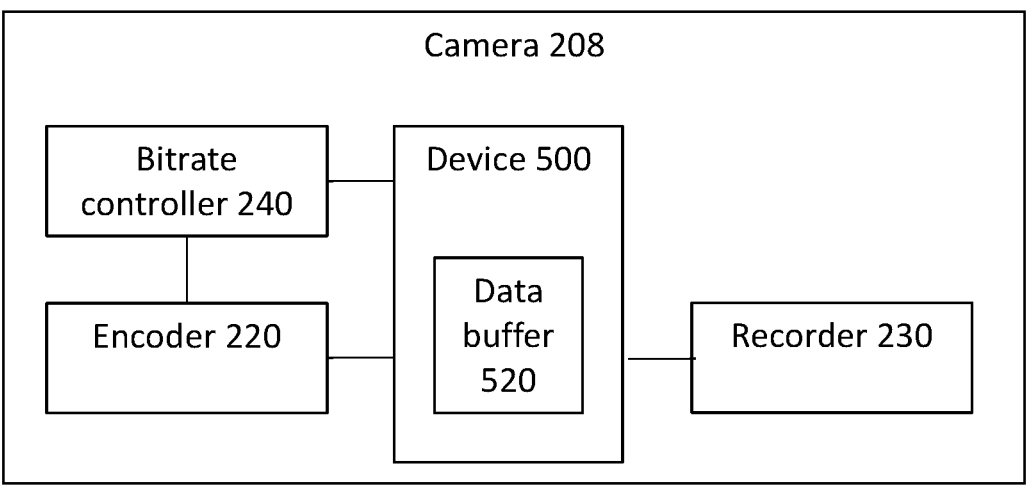
FIG. 2B schematically illustrates an embodiment of a camera comprising a device for managing encoded images frames in a data buffer.
Figure 5:
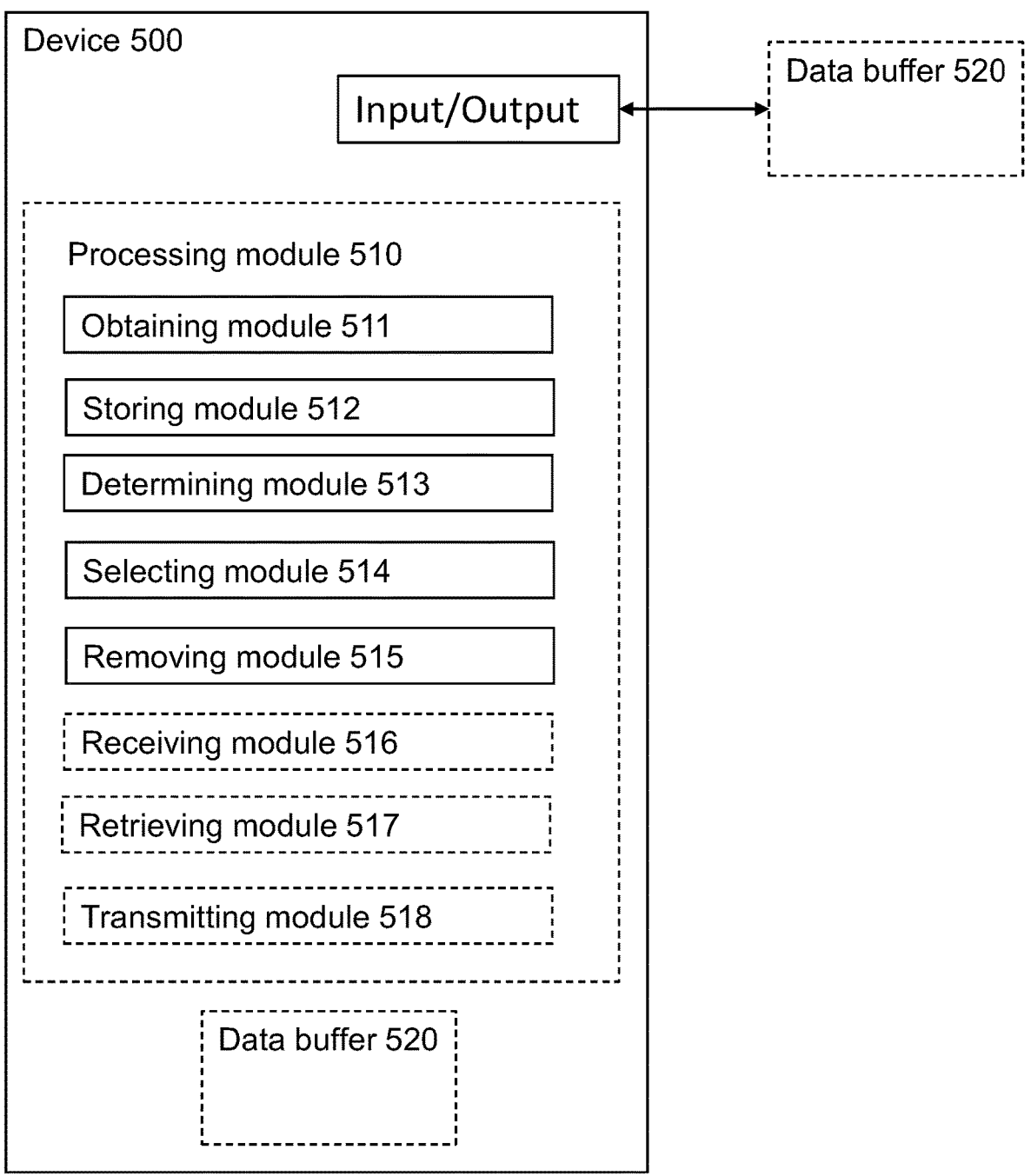
FIG. 5 schematically illustrates a block diagram of a device for managing encoded images frames in a data buffer according to embodiments.

In case an event is detected in or relating to the scene 202 monitored by the camera 208, it is desirable to record the video sequence capturing the event in order to enable replay of the video sequence at a later point in time. As previously mentioned, it is also often desirable to include a pre-event video sequence in the recording. Therefore, the camera 208 may comprise or be operatively connected to a data buffer configured to buffer, i.e., temporarily store, encoded image frames which in case of an event will constitute the pre-event video sequence. As will be described in more detail below with reference to FIG. 5, a data buffer 520 may be comprised in or operatively connected to a device 500 for managing encoded image frames in the data buffer 520. The data buffer 520 may be a memory or a region of the memory which memory/region is used to temporarily store encoded image frames. The memory may be implemented in a physical memory in hardware or by using a virtual memory in software, pointing at a location in the physical memory. Since the data buffer 520 may be comprised in or be connected to the device 500, the data buffer 520 is in FIG. 5 illustrated as dotted boxes arranged within the device 500 and external to the device 500, respectively. The device 500 may be comprised in the camera 208 as schematically illustrated in FIG. 2B.

Figure 2C:
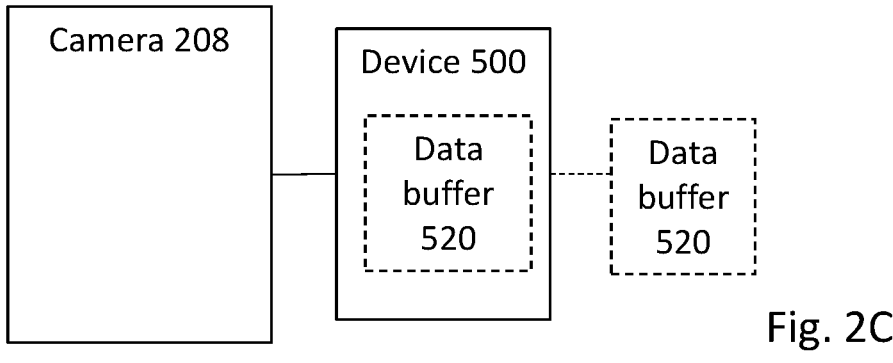
FIG. 2C schematically illustrates embodiments wherein a device for managing encoded image frames in a data buffer is connected to a camera.

In FIG. 2C it is schematically illustrated that the device 500 can be operatively connected to the camera 208 and that the data buffer 520 may be comprised in the device 500 or external to and operatively connected to the device 500. It is also envisioned that the device 500 may be comprised in the camera 208 and that the data buffer 520 is arranged external to the camera 208 but in operational connection with the device 500 (not shown).

Figure 2D:
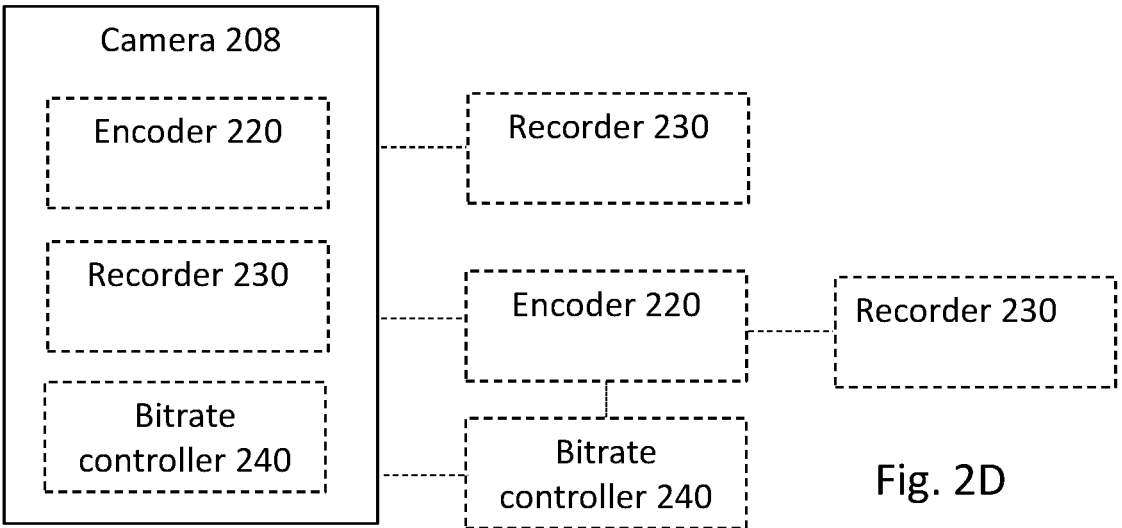
FIG. 2D schematically illustrates embodiments of a camera comprising or being connected to an encoder and a recorder.

FIG. 2D schematically illustrates embodiments of the camera 208 comprising an encoder 220 configured to encode a sequence of captured image frames into a sequence of encoded image frames and a recorder 230 configured to record a sequence of encoded image frames retrieved from the data buffer 520. However, the recorder 230 may be arranged external to the camera 208 but in operational connection with the camera 208. It should also be understood that both the encoder 220 and the recorder 230 may be arranged external to the camera 208. In FIG. 2D it is also schematically illustrated that a controller 240, such as a bitrate controller, may be comprised in the camera 208 or operatively connected to the camera 208. The controller 240 controls the output bitrate of the encoder 220, and thus the controller 240 is operatively connected to the encoder 220. The controller 240 may control the encoder 220 to have the same output bitrate on a sequence of encoded image frames irrespective of whether the sequence of encoded image frames is a pre-event sequence of encoded image frames, an event sequence of encoded image frames or a post-event sequence of image frames. However, the output bitrate of the sequence may be different for one or more of the pre-event sequence, the event sequence and the post-event sequence. Thus, the pre-event sequence may have a first bitrate, the event sequence may have a second bitrate and the post-event sequence may have a third bitrate, which bitrates may be the same or one or more of them may be different from the other bitrates.

The encoder 220 may be a video encoder configured to encode a sequence of image frames into a sequence of encoded image frames conforming to a standard video coding format. Some examples of standard video coding formats are H.264, H.265, AV1 and VVC.

The recorder 230 may be a data recorder, such as a video recorder, configured to record/store data/video. The recorder 230 may further be a network recorder 230 configured to be connected to other devices, such as the camera 208 and/or the encoder 220 over a communications network, e.g., the network 212.

The recording of the video sequence provided by the recorder 230 can be seen as a more permanent storage of the video sequence as compared to the more temporary storage provided by the data buffer 520. However, it should be understood that the permanent storage of the video sequence does not mean that the video sequence is stored forever but it should be understood as a storage over a longer time period as compared to a shorter time period provided by the data buffer 520. For example, the storage time in the data buffer 520 may be in the range from one or more seconds to several minutes or even hours while the storage time of the recorder 230 may be in the range from one or more days to several months or even years, just to give some examples.

Figure 3:
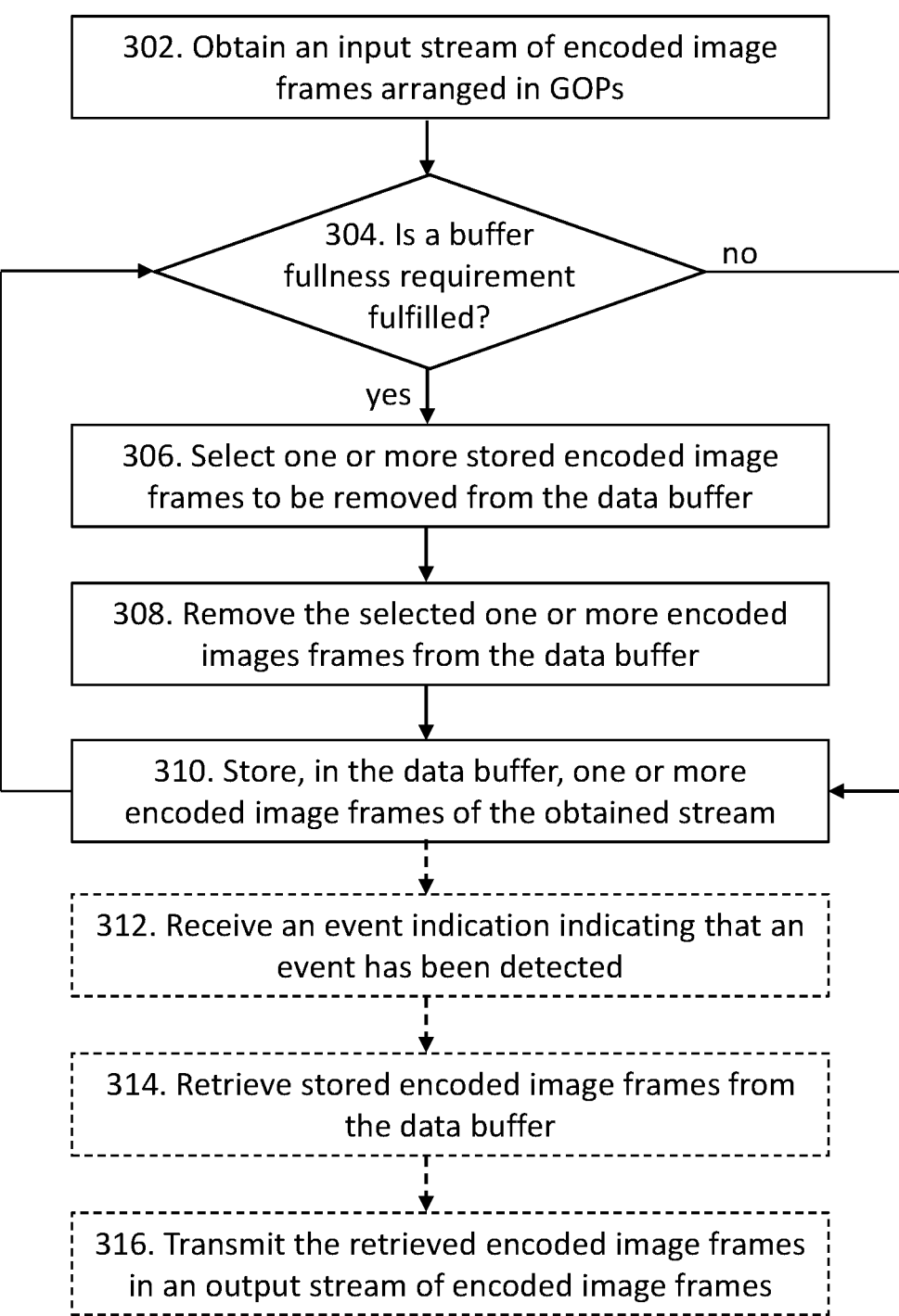
FIG. 3 schematically illustrates a flow chart of a method for managing encoded image frames in a data buffer according to embodiments.
Figure 4A:
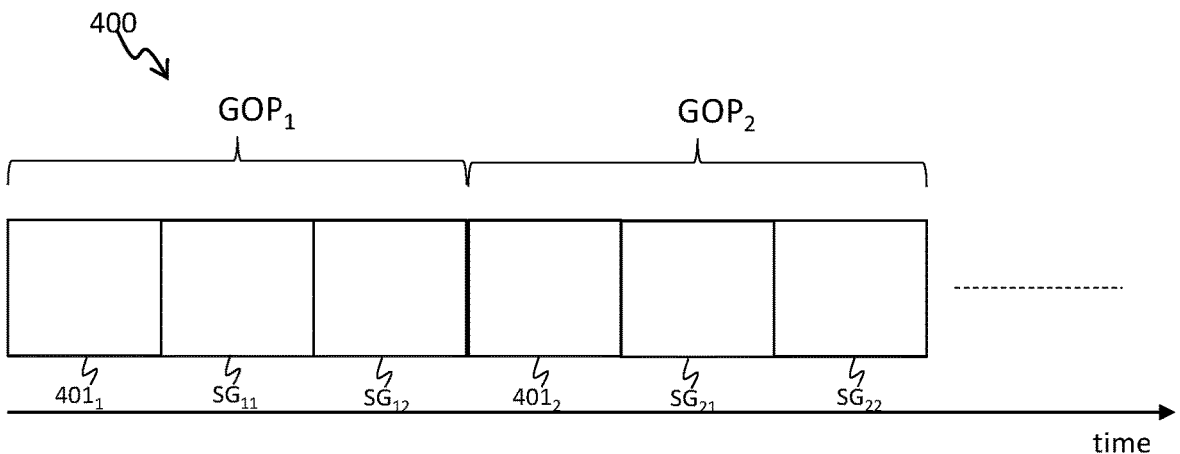
FIG. 4A schematically illustrates a sequence of encoded image frames according to embodiments.
Figure 4B:
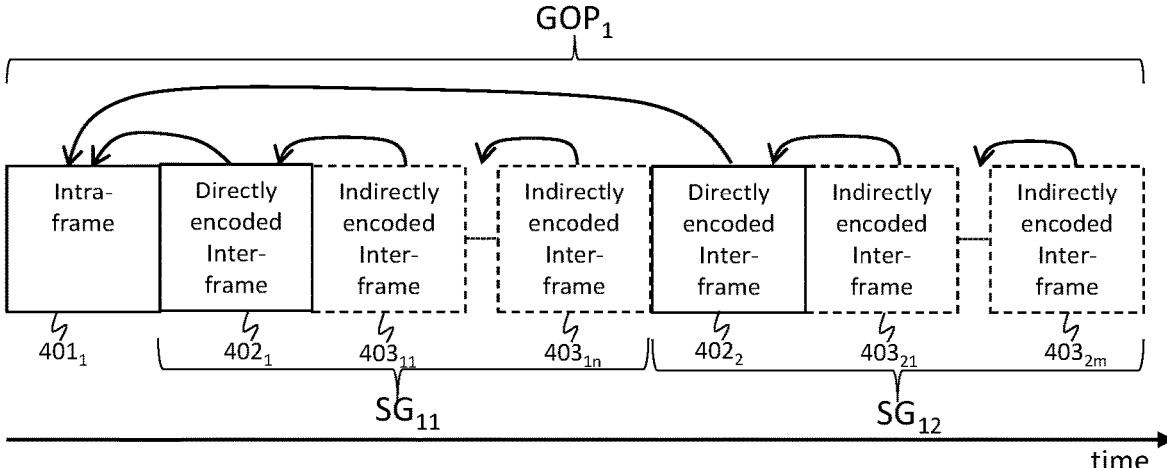
FIG. 4B schematically illustrates a group of pictures (GOP) according to embodiments.
Figure 4C:
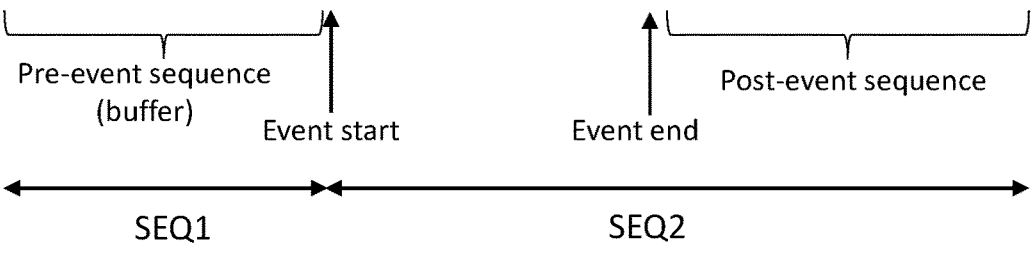
FIG. 4C schematically illustrates an event video sequence according to embodiments.

A method for managing encoded image frames in a data buffer configured to store encoded image frames, will now be described with reference to FIG. 3. Reference will also be made to FIGS. 4A, 4B and 4C, and to FIG. 5. FIG. 4A schematically illustrates a sequence of encoded image frames according to embodiments, FIG. 4B schematically illustrates a GOP according to embodiments, and FIG. 4C schematically illustrates an event video sequence according to embodiments. FIG. 5 schematically illustrates a block diagram of the device 500 for managing encoded images frames in the data buffer 520 according to embodiments. The data buffer 520 may be a pre-event buffer configured to buffer, i.e., temporarily store, a pre-event video sequence having a pre-defined pre-event recording time. In this disclosure, the invention will be described with reference to the data buffer as a pre-event buffer storing a pre-event video sequence of encoded image frames. However, it should be understood that the data buffer does not have to be a pre-event buffer storing a pre-event video sequence but could be another type of data buffer storing another type of video sequence of encoded image frames having a pre-defined recording time. Further, it should be understood that some of the actions may be optional and that actions may be taken in another suitable order.

Action 302

In action 302, an input stream 400 of encoded image frames arranged in groups of pictures (GOPs) is obtained, wherein each GOP comprises a single intra-frame 401, and two or more frame subgroups $SG_1$, $SG_2$. Further, each frame subgroup $SG_1$, $SG_2$ comprises a single directly encoded inter-frame 402 encoded with a direct reference to the intra-frame 401, and zero or more indirectly encoded inter-frames 403 encoded with an indirect reference to the intra-frame 401 via the single directly encoded inter-frame 402.

In FIG. 4A the input stream 400 of encoded image frames is arranged in a number of GOPs out of which a first GOP $GOP_1$ and a second GOP $GOP_2$ are illustrated. As indicated by the time axis, the first GOP $GOP_1$ precedes the second GOP $GOP_2$ in time meaning that the first GOP $GOP_1$ is older than the second GOP $GOP_2$ and that it was captured before $GOP_2$. Further, each GOP comprises an intra-frame 401 and two frame subgroups $SG_1$, $SG_2$. In FIG. 4A, the intra-frame of $GOP_1$ is referred to using the reference sign 401$_1$, wherein the subscript number denotes the GOP number, and the two frame subgroups of $GOP_1$ are referred to using the reference signs $SG_{11}$ and $SG_{12}$, wherein the first subscript number denotes the GOP number and the second subscript number denotes whether the subgroup is the first or second subgroup of the GOP. The same notation is used for $GOP_2$. However, it should be understood that in this disclosure, the subscript number of the GOP is only used when it is desired to distinguish between two GOPs such as between $GOP_1$ and $GOP_2$.

In FIG. 4B it is schematically illustrated that $GOP_1$ comprises the single intra-frame 401$_1$, and the two frame subgroups $SG_{11}$ and $SG_{12}$. Further, it is illustrated that each frame subgroup $SG_{11}$, $SG_{12}$ comprises a respective single directly encoded inter-frame 402$_1$ and 402$_2$, wherein the subscript number of the respective single directly encoded inter-frame denotes to which one of the two frame subgroups the respective single directly encoded inter-frame belong. Both of the single directly encoded inter-frames $402_1$, $402_2$ are encoded with a reference directly to the single intra-frame $401_1$ of the $GOP_1$ as indicted by the arrow from each of the single directly encoded inter-frames $402_1$, $402_2$ to the single intra-frame $401_1$. In some embodiments, the frame subgroup consists of only one frame, i.e., of only the single directly encoded inter-frame 402. The single directly encoded inter-frame 402 may be a P-frame, an F-frame or an R-frame encoded with a direct reference to the intra-frame 401. In this disclosure, the single directly encoded inter-frame 402 will be referred to as an F-frame.

As also illustrated in FIG. 4B, the subgroup $SG_{11}$ of $GOP_1$ may possibly comprise one or more indirectly encoded inter-frames $403_{11}$-$403_{1n}$, and the subgroup $SG_{12}$ of $GOP_1$ may possibly comprise one or more indirectly encoded inter-frames $403_{21}$-$403_{2m}$. In order to indicate that the one or more indirectly encoded inter-frames are optional they are indicated as dotted boxes in the figure. Each of the indirectly encoded inter-frames 403 may be a P-frame or a B-frame.

Thus, each frame subgroup $SG_1$, $SG_2$, comprises the single directly encoded inter-frame 402 encoded with a direct reference to the intra-frame 401. As mentioned above, sometimes this single directly encoded inter-frame 402 is the only frame comprised in the subgroup and consequently no indirectly encoded inter-frame 403 is comprised in the subgroup. However, each subgroup may comprise one or more indirectly encoded inter-frames 403 in addition to the single directly encoded inter-frame 402.

That each subgroup comprises a single directly encoded inter-frame 402 and zero or more indirectly encoded inter-frames 403 may be expressed as each subgroup comprises a single directly encoded inter-frame 402 and none, one or more indirectly encoded inter-frames 403. Alternatively, it may be expressed as each subgroup comprises a single directly encoded inter-frame 402 and possibly one or more indirectly encoded inter-frames 403.

Whether or not a subgroup comprises zero or more indirectly encoded inter-frames 403 in addition to the single directly encoded inter-frame 402 depends on how the input stream 400 of encoded image frames are encoded.

The input stream 400 is encoded by the encoder 220 under control of the controller 240. Thus, the controller 240 controls the encoder 220 to encode captured image frames into the input stream 400 of encoded image frames arranged in GOPs, wherein each GOP comprises a single intra-frame 401, and two or more frame subgroups $SG_1$, $SG_2$. The controller 240 may employ a constant bitrate (CBR), a maximum bitrate (MBR), or a variable bitrate (VBR). CBR means that the encoder 220 will strive to always output the same bitrate, regardless of what happens in the captured scene. If bandwidth is limited, this may lead to low-quality images when there is motion in the scene, but high-quality images when the scene is static. In a surveillance or monitoring situation, this is generally not useful, as a scene with motion is normally of more interest than a static scene. With MBR, the bitrate is allowed to vary, as long as it does not exceed the bitrate limit set. The problems related to this approach are similar to the ones associated with CBR. If the MBR limit is set too low, images of a scene with motion may be of low quality. However, if the limit is set higher, in order to accommodate the motion, the output bitrate may be unnecessarily high when encoding images of a static scene. VBR may also be referred to as constant quality bitrate, meaning that the quality of the encoded images should be kept constant, but the output bitrate is allowed to vary depending on what is happening in the scene. This approach may lead to high output bitrate when there is motion in the scene. This is particularly problematic if bandwidth is limited, such as when transmitting encoded image frames over a mobile network. Similarly, it is problematic if storage is limited, such as when buffering encoded image frames in a data buffer or when storing encoded image frames on board the camera, e.g., on an SD card. High output bitrates may also be problematic in large systems of cameras if several cameras transmit images of scenes with motion simultaneously.

Regardless of the bitrate control scheme used by the controller 240, one of the parameters that can be adjusted in order to comply with the bitrate set by the controller 240 is the GOP length. In some applications, the GOP length is determined dynamically by the controller 240. For example, if the bitrate is to be decreased, the GOP-length, i.e., the number of encoded image frames comprised in the GOP, may be increased. In correspondence, if the bitrate is to be increased, the GOP-length may be decreased.

Based on knowledge about the total storage capacity of the data buffer 520, about the pre-defined pre-event recording time, and about a desired frame rate, the controller 240 determines how to encode each image frame. If for example the total storage capacity of the data buffer 520 is 270 MB, the pre-defined pre-event recording time is 90 seconds, and the frame rate is 30 image frames per second, 2700 (30 fps×90 s) encoded image frames are to be stored in the data buffer 520. If these 2700 encoded image frames were to have the same size, they would each have to have a size of 0.1 MB (0.8 Mbit). By encoding the image frames in GOPs, wherein each GOP comprises a single intra-frame and one or more frame subgroups as described herein, the utilisation of the available storage capacity can be optimised to store encoded image frames of the pre-defined pre-event recording time at the same time as the quality of the video sequence is optimised.

For example, it may be advantageous to encode the image frames such that each GOP only comprises one single intra-frame 401 and a number of directly encoded inter-frames 402 that all are encoded with a direct reference to the single intra-frame 401 of the GOP. Such a GOP would not comprise any indirectly encoded inter-frames 403. This may be the case when the GOP is encoded to comprise one I-frame, and a number of F-frames all of which are encoded with a respective reference to the I-frame. In such a scenario, each of the F-frames are considered as constituting a respective frame subgroup. One scenario when it may be advantageous to encode the image frames of a GOP as one I-frame and a number of F-frames is when the encoded image frames are to be stored in a pre-event buffer, such as the data buffer 520, having enough storage space for recording of a pre-event video sequence of a predetermined length, e.g., the pre-defined pre-event recording time, before a point in time when an event started. If the pre-event video sequence only consists of a number of F-frames and the one or more I-frames needed to decode the F-frames, the pre-event video sequence will always be decodable irrespective of whether or not one of more of the F-frames of the GOP previously stored in the data buffer 520 have been removed. Thereby, if the data buffer 520 has enough storage space it is advantageous to store the encoded image frames in GOPs, wherein each GOP consists of one I-frame and a number of, e.g. two or more, F-frames, as that facilitates the managing of the data buffer 520 to enable retrieval of a decodable pre-event video sequence having the pre-defined pre-event recording time.

However, F-frames are usually larger than P-frames, especially in non-static scenes and when the temporal distance between the F-frame and the I-frame to which it is directly encoded increases and when the difference in content between the F-frame and the I-frame increases resulting in that less redundancy can be used in the inter-coding as compared to the case when coding an P-frame that is coded with reference to a frame to which the temporal distance and difference in content are small. Thus F-frames usually requires larger storage space than P-frames. Therefore, in order to reduce the required storage space and still be able to buffer a pre-event video sequence of encoded image frames of the pre-defined pre-event recording time, it may be advantageous to also include one or more P-frames in one or more of the frame subgroups of the input stream 400 of encoded image frames. The controller 240 may control the encoder 220 to encode one or more image frames into one or more indirectly encoded inter-frames 403 (e.g., one or more P-frames), and thereby increasing the frame subgroup to include the one or more indirectly encoded inter-frames 403 in addition to the single directly encoded inter-frame 402 (i.e. the single F-frame in the frame subgroup), when there is a lot of motion in the scene and the difference between the single intra-frame 401 and each directly encoded inter-frame 402 of the GOP would be too large resulting in a too high bitrate. By increasing the number of frames in the frame subgroup, the number of frame subgroups in the GOP and thus also the number of directly encoded inter-frames 402 (i.e., F-frames) in the GOP can be reduced. Most often this will result in a reduction of the bitrate since an indirectly encoded inter-frame 403 (e.g., a P-frame) usually is smaller than a directly encoded inter-frame 402 (i.e., an F-frame).

In FIG. 4B it is schematically illustrated that one or more indirectly encoded inter-frames 403, i.e., one or more P-frames, may be included in each frame subgroup. Each such P-frame is encoded with a direct reference to the image frame directly preceding it in coding order, i.e., with a direct reference to an indirectly encoded inter-frame 403 or to a directly encoded inter-frame 402 preceding it in coding order. Thus, each such P-frame is only indirectly encoded with a reference to the intra-frame 401 of the GOP via the directly encoded inter-frame 402 to which it has a direct or indirect reference.

The input stream 400 of encoded image frames may be obtained by an obtaining module 511. The obtaining module 511 may be comprised in the device 500 for managing encoded image frames in the data buffer 520. The device 500 may be comprised in a camera, such as the camera 208, capturing the image frames and encoding them into the input stream 400 of encoded image frames. Alternatively, when the camera 208 does not comprise an encoder, the device 500 may be comprised in an encoder 220 connected to the camera 208. In this latter scenario, the encoder 220 receives the captured image frames from the camera 208 and encodes them into the input stream 400 of encoded image frames. Thereby, the device 500 obtains the input stream 400 of encoded image frames. As another alternative, the device 500 may be comprised in a recorder 230 configured to receive or retrieve the input stream 400 of encoded image frames from the camera 208 or the encoder 220, just to give some examples.

As mentioned above, the controller 240 may decide how to encode captured image frames and to send a control signal to the encoder 220 configured to encode the captured image frames in accordance with the control signal. Thus, the controller 240 may decide whether or not to include one or more indirectly encoded inter-frames 403, i.e., to include one or more P-frames, in each frame subgroup. Whether or not to include one or more indirectly encoded inter-frames 403 may be based on the size of the preceding single directly encoded inter-frame 402, i.e., based on the size of the preceding F-frame. If the size of the preceding single directly encoded inter-frame 402 is large, that indicates a large difference between the preceding single directly encoded inter-frame 402 and the single intra-frame 401 based on which it is encoded. This large difference is in turn an indication of a lot of motion in the scene between the capturing of the single intra-frame 401 and the single directly encoded inter-frame 402. If a subsequent image frame were to be encoded as a subsequent single directly encoded inter-frame 402 of a subsequent frame subgroup that subsequent single directly encoded inter-frame 402 would also have a large size due to the motion in the scene. In such case, it may be advantageous to encode the subsequent image frame as an indirectly encoded inter-frame 403, e.g. a P-frame, with a reference to the preceding single directly encoded inter-frame 402 as the size of the indirectly encoded inter-frame 403 may be smaller than the size of the directly encoded inter-frame 402. Thus, the controller 240 may decide to reduce the number of frame subgroups in the GOP and instead increase the number of indirectly encoded inter-frames 403 in one or more of the frame subgroups in order to reduce the bitrate.

Action 304

Before one or more encoded image frames of the obtained input stream 400 is stored in the data buffer 520 it is determined whether or not the data buffer 520 has capacity to store the one or more encoded image frames. This is performed in action 304, wherein it is determined whether or not a buffer fullness requirement is fulfilled.

If the buffer fullness requirement is not fulfilled, the data buffer 520 has capacity to store the one or more encoded image frames of the obtained input stream 400. In case the buffer fullness requirement is not fulfilled, the method continues with action 310.

On the other hand, if the buffer fullness requirement is fulfilled, one or more stored encoded image frames have to be removed from the data buffer 520 before the one or more encoded image frames of the obtained input stream 400 can be stored. In such case, the actions 306 and 308 have to be performed before the method proceeds to action 310.

The buffer fullness requirement may be a buffer time requirement that is fulfilled when a total recording time of the stored encoded image frames is equal to a pre-defined recording time or will become larger than the pre-defined recording time if the one or more encoded image frames of the obtained input stream are stored. When the buffer time requirement is fulfilled, one or more encoded image frames stored in the data buffer 520 should be removed in order to free enough storage space in the data buffer 520 for storage of the one or more encoded image frame captured at a point in time that is after the point in time the last stored encoded image frame was captured. Especially, the first encoded image frame of the one or more encoded image frames to be stored was captured directly consecutive of the last encoded image frame stored in the data buffer 520. However, it is not possible to just arbitrarily remove one or more stored encoded image frames from the data buffer 520 since the remaining encoded image frames in the data buffer 520 have to be decodable and have to be of the pre-defined recording time. If the remaining encoded image frames are not decodable it will not be possible to replay and display a pre-event video sequence based on all the remaining encoded image frames, and especially not a pre-event video sequence having a pre-defined pre-event recording time. In order to be able to display a retrieved pre-event video sequence all the encoded image frames of the retrieved pre-event video sequence need to be decodable. Thus, if a number of inter-frames are retrieved from the data buffer 520, also the intra-frame used when encoding the inter-frames is needed in order to be able to decode the inter-frames. If a referenced intra-frame has been removed from the data buffer 520, the retrieved inter-frames coded with reference to the referenced intra-frame will not be decodable and thus it will not be possible to replay and view them. As those retrieved inter-frames are a part of the pre-event video sequence but not displayable, due to not being decodable, the displayable time length of the pre-event video sequence will be shorter than desired, i.e., shorter than the pre-defined pre-event recording time. Consequently, important information preceding the start of the event may not be replayed to an operator. Therefore, it is important how to select the one or more encoded image frames that are to be deleted from the data buffer 520.

The selection of the one or more encoded image frames to be removed will be described in more detail below with reference to Action 308, but either could a non-referenced encoded image frame or a frame subgroup be selected. Further, the selected one or more encoded image frames to be removed may be a so-called old non-referenced encoded image frame. An old non-referenced encoded image frame is a non-referenced encoded image frame captured at a point in time preceding a current point in time with more than the pre-defined recording time, i.e. with more than the pre-defined pre-event recording time. The current point in time may be the event point in time, i.e., the time point when the event occurred or was detected. Thus, the selected one or more encoded image frames may be captured at a point in time preceding a current point in time minus the pre-defined recording time. For example, the pre-defined recording time may be in the range from a number of seconds to tens of minutes, such as in the range from 5 seconds to 10 minutes.

Alternatively, or additionally, the buffer fullness requirement may be a buffer size requirement. For example, the buffer fullness requirement may be a buffer size requirement that is fulfilled when a total size of the stored encoded image frames is larger than a predetermined buffer size threshold. The predetermined buffer size threshold may be a value in the range between 50 and 500 megabyte (MB). Sometimes the predetermined buffer size threshold may be 100 MBs.

As another example, the buffer fullness requirement may be a buffer size requirement that is fulfilled when a total number of stored encoded image frames is larger than a predetermined number of stored encoded image frames. The predetermined number of stored encoded image frames to be buffered in the data buffer 520 may be set based on the use case. In some implementations it may be desired to buffer a certain number of encoded image frames irrespective of their respective size. A desired number of GOPs and/or a desired number of encoded image frames in each GOP may be taken into consideration when setting the predetermined number of stored encoded image frames. The predetermined number of stored encoded image frames may be set by a user. In some embodiments, the predetermined number of stored encoded image frames does not, in the counting, include stored old encoded image frames that are referenced image frames as they are kept in the data buffer only to enable decoding of one or more stored inter-frames referring to them. Sometimes such old encoded image frames are only used to enable the decoding of the one or more stored inter-frames referring to them and will not be displayed when a pre-event video sequence comprising them is replayed. The predetermined number of stored encoded image frames may be a value in the range between 30 and 2700 when the frame rate is 30 frames per second and the pre-event video sequence has a desired pe-event recording time in the range between 1 second and 90 seconds. However, the predetermined number of stored image frames may be another as it will vary with the frame rate and with the desired pe-event recording time of the pre-event video sequence.

The determination of whether or not the buffer fullness requirement is fulfilled may be performed by a determination module 513. The determination module 513 may be comprised in the device 500.

Action 306

When the buffer fullness requirement is fulfilled, one or more encoded image frames to be removed from the data buffer 520 is selected from the stored encoded image frames. The selected one or more encoded image frames is at least one out of: a non-referenced encoded image frame and a frame subgroup out of the two or more frame subgroups.

The non-referenced encoded image frame is an encoded image frame not being used as a reference image frame for any of the stored encoded image frames. Thus, it should be understood that the non-referenced encoded image frame could be an I-frame that is not used as a reference frame for another encoded image frame, e.g., for an F-frame, or a P-frame or a B-frame. Further, the non-referenced encoded image frame could be an F-frame that is not used as a reference frame for another encoded image frame, e.g., for a P-frame or a B-frame. Furthermore, the non-referenced encoded image frame could be a P- or a B-frame that is not used as a reference frame for another encoded image frame, e.g., for another P-frame or another B-frame. In other words, if no other image frame is encoded using the encoded image frame as a reference, that encoded image frame is in this disclosure referred to as a non-referenced encoded image frame.

When selecting the one or more encoded image frames one alternative is to select the one or more encoded image frames from a group of non-referenced encoded image frames. Another alternative is to select the one or more encoded image frames as a frame subgroup out of the two or more frame subgroups.

When a non-referenced encoded image frame is selected as the one or more encoded image frames to be removed, the non-referenced encoded image frame could be selected based on size, e.g., largest frame size, based on size of GOP or frame subgroup comprising the non-referenced encoded image frame, or according to a pre-defined pattern, e.g., every second, or third frame is to be selected. Thus, when the selected one or more encoded image frames is the non-referenced encoded image frame, the non-referenced encoded image frame is at least one out of:

A non-referenced encoded image frame having a size in bytes that is larger than a size in bytes of any other stored non-referenced encoded image frames. By selecting the largest non-referenced encoded image frame, the largest possible storage space in the data buffer 520 by removing only one encoded image frame will be made available.

A non-referenced encoded image frame comprised in a GOP having a number of encoded image frames that is larger than a number of encoded image frames of any other stored GOP. A large GOP may indicate that the scene captured by the encoded image frames of the GOP is not changing a lot, and that the inter-frames of the GOP are small. This may be the case when the GOP length is dynamically controlled based on detected motion in the scene, based on other detected events such as detected sound or based on scheduled changes of the GOP length. Selecting the non-referenced encoded image frame from the largest GOP for removal will not affect the display of the pre-event video sequence as much as if a larger encoded image frame from a smaller GOP were selected and deleted.

A non-referenced encoded image frame comprised in a frame subgroup having a number of encoded image frames that is larger than a number of encoded image frames of any other stored frame subgroup. A large frame subgroup indicates that the scene captured by the encoded image frames of the frame subgroup is not changing a lot, and that the inter-frames of the frame subgroup are small. Thus, selecting the non-referenced encoded image frame from the largest frame subgroup for removal will not affect the display of the pre-event video sequence as much as if a possibly larger encoded image frame from a smaller frame subgroup were selected and deleted.

A non-referenced encoded image frame selected according to a pre-defined pattern. By selecting the non-referenced encoded image frame according to a pre-defined pattern, e.g. a first pre-defined pattern, such that every second or third image frame is selected and then removed, the possible negative visual effect of "missing" image frames when displaying the pre-event video sequence is reduced since the "missing" image frames are distributed in the pre-event video sequence according to the predefined pattern. Further, an evenly distributed removal of image frames may also result in an evenly distributed reduction in frame rate.

When a frame subgroup is selected as the one or more encoded image frames to be removed, the frame subgroup may be selected based on size, e.g., the frame subgroup having the largest size may be selected. Alternatively, the frame subgroup may be selected based on its number of frames, e.g., the frame subgroup having the largest number of frames may be selected. As yet an alternative, the frame subgroup may be selected according to a pre-defined pattern, e.g., every second, or third frame subgroup is to be selected, or 3 out of 4 or 9 out of 10 frame subgroups are to be selected. Thus, when the selected one or more encoded image frames is the frame subgroup, the frame subgroup may be at least one out of:

A frame subgroup having a size in bytes that is larger than a size in bytes of any other stored frame subgroup. By selecting the frame subgroup having the largest size in bytes, the largest possible storage space in the data buffer by removing only one frame subgroup will be made available.

A frame subgroup comprising a number of encoded image frames that is larger than a number of encoded image frames of any other stored frame subgroup. A frame subgroup having a large number of encoded image frames indicates that the scene captured by the encoded image frames of the frame subgroup is not changing a lot, and that the inter-frames of the frame subgroup are small. Thus, by selecting the largest frame subgroup, i.e. largest in number of comprised encoded image frames, for removal will not affect the display of the pre-event video sequence as much as if a smaller frame subgroup were selected and deleted.

A frame subgroup selected according to a pre-defined pattern. By selecting the frame subgroup according to a predefined pattern, e.g. a second pre-defined pattern that may be different from the first pre-defined pattern mentioned above, such that every second or third frame subgroup is selected and then removed, the possible negative visual effect of "missing" image frames when displaying the pre-event video sequence is reduced since the "missing" image frames are distributed in the pre-event video sequence according to the predefined pattern.

In order to keep the most recent encoded image frames in the data buffer 520, it is sometimes desirable to select the non-referenced encoded image frame or a frame subgroup from the oldest GOP stored in the data buffer 520, i.e., from the GOP oldest in time. Thus, the selected one or more encoded image frames may be comprised in a stored GOP captured at a point in time preceding a capturing point in time of any other stored GOP.

For example, the oldest frame subgroup comprised in the oldest GOP may be selected. Thus, the selected one or more encoded image frames is comprised in a frame subgroup captured at a point in time preceding a capturing point in time of any other frame subgroup comprised in the stored GOP.

The selecting of the one or more encoded image frames may be performed by a selecting module 514. The selecting module 514 may be comprised in the device 500.

Action 308

The selected one or more encoded image frames is/are removed from the data buffer 520. This means that the selected one or more stored encoded image frames is/are deleted from the data buffer 520 to release data space for new encoded image frames to be stored in the data buffer 520. It should be understood that the selected one or more stored encoded image frames may be removed, and thus deleted, from the data buffer 520 by being overwritten with one or more encoded image frames to be stored in the data buffer 520 when storing it/them in the data buffer 520.

The removal of the one or more encoded image frames may be performed by a removing module 515. The removing module 515 may be comprised in the device 500.

Action 310

In action 310, one or more encoded image frames of the obtained input stream 400 of encoded image frames arranged in GOPs is stored in the data buffer 520.

The encoded image frames may be stored in the data buffer 520 one by one in coding order. This may be performed by a storing module 512 configured to store encoded image frames in the data buffer 520. As mentioned in action 308, the selected one or more stored encoded image frames may be removed by overwriting them with the one or more encoded image frames to be stored. This may be performed by the storing module 512.

When starting up the data buffer 520, all storage space of the data buffer 520 may be available and thus encoded image frames corresponding to a pre-event video sequence of the pre-defined pre-event recording time may be stored in the data buffer 520.

However, during operation of the data buffer 520, one or more encoded image frames are already stored in the data buffer 520, and then action 306, and possibly also the actions 308 and 310, have to be performed, before one or more other encoded image frames in the obtained input stream 400 actually can be stored in the data buffer 520.

Thus, continuously as the input stream 400 is obtained, one or more encoded image frames thereof are stored in the data buffer 520, either immediately or after removal of one or more stored encoded image frames as described in actions 306, 308, and 310 above. The one or more encoded image frames may be stored one by one in coding order. This may be performed by the storing module 512. The storing module 512 may be comprised in the device 500.

In some embodiments, the method described above may further comprise additional actions 312, 314 and 316 to be taken when an event has occurred, e.g., when an event has been detected. These actions will be described in more detail below. However, it should be understood that they may be performed interleaved with the preceding actions in any suitable way.

Action 312

In action 312 an event indication is received. The event indication indicates that an event has been detected. The event may be an alarm, or an indication that a movement has been detected in the captured scene. As another example, the event indication may be an activation of a recording button on a BWC. The event indication may be received by a receiving module 516 configured to receive event indications. The receiving module 516 may be comprised in the device 500.

Action 314

Upon receiving the event indication, stored encoded image frames are retrieved from the data buffer 520 in action 314. The stored encoded image frames are also herein referred to as the pre-event video sequence. This may be performed by a retrieving module 517. The retrieving module 517 may be comprised in the device 500.

Action 316

In action 316, the retrieved encoded image frames are transmitted in an output stream of encoded image frames. A transmitting module 518 may perform the transmittal of the retrieved encoded image frames in the output stream of encoded image frames from the device 500 to a receiver. The output stream of encoded image frames received at the receiver may in addition to the retrieved encoded image frames, i.e., the pre-event video sequence, comprise encoded image frames captured during the event, i.e., an event sequence, and possible also encoded image frames captured after the event, i.e., a post-event sequence of encoded image frames. The transmitting module 518 may be comprised in the device 500. The receiver may be the recorder 230, the client 214 or the server 216.

One or more referenced encoded image frames, e.g., one or more referenced I-frames, transmitted in the output stream of encoded image frames may be transmitted with a no-display indication. This may for example be the case when the referenced I-frame is old, e.g. too old to be included in the pre-defined pre-event recording time, and only kept in the data buffer 520 for being used when decoding one or more encoded image frames encoded with a reference to it. Since the old referenced I-frame may have been captured at a point in time corresponding to several frames earlier than the point in time the encoded image frame using it as a reference was captured, the scene may have changed too much between the two image frames so if both of them were displayed one after the other in the video sequence it would not look good. Therefore, it may be more pleasant for a viewer to only see the encoded image frame using the old referenced I-frame as a reference and that is a reason for transmitting the old referenced I-frame with a no-display indication. For example, the no-display indication may be added to the old referenced I-frame when stored in the data buffer or upon or after retrieval of the old referenced I-frame from the data buffer. Thus, the transmitted retrieved encoded image frames may comprise one or more referenced encoded image frames transmitted in the output stream of encoded image frames with a no-display indication. The term "referenced encoded image frame" is used in this disclosure for an encoded image frame used as a reference image frame for any of the retrieved encoded image frames.

Embodiments also relate to a device 500 for managing encoded image frames in a data buffer 520 will now be described with reference to FIG. 5. The data buffer 520 is configured to store encoded image frames.

The data buffer is a region of a memory used to temporarily store data while it is being moved from one place to another. The data buffer 520 may be implemented in a fixed memory location in hardware, or by using a virtual data buffer in software, pointing at a location in the physical memory. The memory may be a random-access memory (RAM) or a flash memory but it could also be a network-attached storage.

The device 500 comprises an obtaining module 511 configured to obtain an input stream of encoded image frames arranged in GOPs, each GOP comprising: a single intra-frame, and two or more subgroups. Each subgroup comprises a single directly encoded inter-frame encoded with a direct reference to the intra-frame, and zero or more indirectly encoded inter-frames encoded with an indirect reference to the intra-frame via the single directly encoded inter-frame.

The device 500 comprises a determining module 513 configured to determine whether or not a buffer fullness requirement is fulfilled.

The device 500 also comprises a selecting module 514 configured to, when the buffer fullness requirement is fulfilled, select, from encoded image frames stored in the data buffer 520, one or more encoded image frames to be removed from the data buffer 520. The selected one or more encoded image frames is at least one out of: a non-referenced encoded image frame, wherein the non-referenced encoded image frame is an encoded image frame not being used as a reference image frame for any of the stored encoded image frames; and a subgroup out of the two or more subgroups.

Further, the device 500 comprises a removing module 515 configured to remove the selected one or more encoded image frames from the data buffer.

Furthermore, the device 500 comprises a storing module 512 configured to store, in the data buffer 520, the obtained stream of encoded image frames arranged in the GOP.

In some embodiments, the device 500 is further configured to perform the method according to one or more of the actions described herein.

The device 500 may be comprised in the camera 208, the encoder 220, or the recorder 230.

Embodiments also relate to a non-transitory computer-readable medium having stored thereon computer code instructions adapted to carry out embodiments of the method described herein when executed by a device having processing capability.

As described above, the device 500 may be configured to implement a method for managing encoded image frames in a data buffer. For this purpose, the device 500 may include circuitry which is configured to implement the various method steps described herein.

In a hardware implementation, the circuitry may be dedicated and specifically designed to implement one or more of the method steps. The circuitry may be in the form of one or more integrated circuits, such as one or more application specific integrated circuits or one or more field-programmable gate arrays. By way of example, the device 500 may hence comprise circuitry which obtains an input stream 400 of encoded image frames arranged in GOPs, wherein each GOP comprises: a single intra-frame 401, and two or more frame subgroups $SG_1,SG_2$, and wherein each frame subgroup $SG_1,SG_2$ comprises a single directly encoded inter-frame 402 encoded with a direct reference to the intra-frame 401, and zero or more indirectly encoded inter-frames 403 encoded with an indirect reference to the single intra-frame 401 via the single directly encoded inter-frame 402. Further, the circuitry determines whether or not a buffer fullness requirement is fulfilled. When the buffer fullness requirement is fulfilled, the circuitry selects from encoded image frames stored in the data buffer, one or more encoded image frames to be removed from the data buffer. The selected one or more encoded image frames is at least one out of: a non-referenced encoded image frame, wherein the non-referenced encoded image frame is an encoded image frame not being used as a reference image frame for any of the stored encoded image frames; and a frame subgroup out of the two or more frame subgroups. Yet further, the circuitry, removes the selected one or more encoded image frames from the data buffer 520 and stores, in the data buffer 520, the obtained stream 400 of encoded image frames arranged in the GOP.

In a software implementation, the circuitry may instead be in the form of a processor, such as a microprocessor, which in association with computer code instructions stored on a (non-transitory) computer-readable medium, such as a non-volatile memory, causes the device 500 to carry out any method disclosed herein. Examples of non-volatile memory include read-only memory, flash memory, ferroelectric RAM, magnetic computer storage devices, optical discs, and the like. In a software case, each of the method steps described above may thus correspond to a portion of computer code instructions stored on the computer-readable medium, that, when executed by the processor, causes the device 500 to carry out any method disclosed herein.

It is to be understood that it is also possible to have a combination of a hardware and a software implementation, meaning that some method steps are implemented in hardware and others in software.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method for managing encoded image frames in a pre-event buffer, wherein the encoded image frames depict a scene, the pre-event buffer being configured to temporarily store encoded image frames, which stored encoded image frames, when an event in, or relating to, the scene is detected, constitute a video sequence captured before the event, and wherein the method comprises:
   obtaining an input stream of encoded image frames depicting the scene and being arranged in groups of pictures, GOPs, each GOP comprising:
   a single intra-frame, and
   two or more frame subgroups, wherein each frame subgroup comprises:

a single directly encoded inter-frame encoded with a direct reference to the intra-frame, wherein the single directly encoded inter-frame is a P-frame, a fast forward frame or an inter-refresh frame, whereof a fast forward frame or an inter-refresh frame is a forward-predicted inter-frame that refers back to a nearest preceding intra-frame, and
   one or more indirectly encoded inter-frames encoded with an indirect reference to the single intra-frame via the single directly encoded inter-frame, wherein each of the one or more indirectly encoded inter-frame is a P-frame;
before one or more encoded image frames of the obtained input stream is stored in the pre-event buffer, determining whether or not a total recording time of all encoded image frames stored in the pre-event buffer is equal to a pre-defined pre-event recording time or will become larger than the pre-defined pre-event recording time if one or more encoded image frames of the obtained input stream are stored in the pre-event buffer;
when the total recording time of all encoded image frames stored is not equal to the pre-defined pre-event recording time or will not become larger than the pre-defined pre-event recording time if one or more encoded image frames of the obtained input stream are stored in the pre-event buffer, storing in the pre-event buffer, one or more encoded image frames comprised in the obtained input stream until the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer; and
when the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer:
selecting from encoded image frames stored in the pre-event buffer, one frame subgroup out of the two or more frame subgroups or more encoded image frames to be removed from the pre-event buffer;
removing the selected frame subgroup from the pre-event buffer; and
storing, in the pre-event buffer, one or more encoded image frames comprised in the obtained input stream until the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer,
thereby managing the encoded image frames temporarily stored in the pre-event buffer to be only those encoded image frames constituting a decodable video sequence having the pre-defined pre-event recording time.

2. The method of claim 1, wherein the selected frame subgroup is captured at a point in time preceding a current point in time minus the pre-defined pre-event recording time.

3. The method of claim 1, wherein the pre-defined pre-event recording time is in the range from a number of seconds to tens of minutes, such as in the range from 5 seconds to 10 minutes.

4. The method of claim 1, when the selected frame subgroup is at least one out of:

a frame subgroup having a size in bytes that is larger than a size in bytes of any other stored frame subgroup;

a frame subgroup comprising a number of encoded image frames that is larger than a number of encoded image frames of any other stored frame subgroup; or a frame subgroup selected according to a pre-defined pattern.

5. The method of claim 1, wherein the selected frame subgroup is comprised in a stored GOP captured at a point in time preceding a capturing point in time of any other stored GOP.

6. The method of claim 5, wherein the selected frame subgroup is captured at a point in time preceding a capturing point in time of any other frame subgroup comprised in the stored GOP.

7. The method of claim 1, further comprising:

receiving an event indication indicating that an event has been detected;

upon receiving the event indication, retrieving stored encoded image frames from the pre-event buffer, and transmitting the retrieved encoded image frames in an output stream of encoded image frames.

8. A device for managing encoded image frames in a pre-event buffer, wherein the encoded image frames depict a scene, wherein the pre-event buffer is configured to temporarily store encoded image frames, which stored encoded image frames, when an event in, or relating to, the scene is detected, constitute a video sequence captured before the event and wherein the device comprises:

a processor and the pre-event buffer, wherein the processor is configured to:

obtain an input stream of encoded image frames depicting the scene and being arranged in groups of pictures, GOPs, each GOP comprising:

a single intra-frame, and two or more frame subgroups, wherein each frame subgroup comprises:

a single directly encoded inter-frame encoded with a direct reference to the intra-frame, wherein the single directly encoded inter-frame is a P-frame, a fast forward frame or an inter-refresh frame, whereof a fast forward frame or an inter-refresh frame is a forward-predicted inter-frame that refers back to a nearest preceding intra-frame, and one or more indirectly encoded inter-frames encoded with an indirect reference to the single intra-frame via the single directly encoded inter-frame, wherein each of the one or more indirectly encoded inter-frames is a P-frame;

determine, before one or more encoded image frames of the obtained input stream is stored in the pre-event buffer, whether or not a total recording time of all encoded image frames stored in the pre-event buffer is equal to a pre-defined pre-event recording time or will become larger than the pre-defined pre-event recording time if one or more encoded image frames of the obtained input stream are stored in the pre-event buffer;

when the total recording time of all encoded image frames stored in the pre-event buffer is not equal to the pre-defined pre-event recording time or will not become larger than the pre-defined pre-event recording time if one or more encoded image frames of the obtained input stream are stored in the pre-event buffer, store one or more encoded image frames comprised in the obtained input stream in the pre-event buffer until the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer; and when the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer:

select, from encoded image frames stored in the pre-event buffer, one frame subgroup out of the two or more frame subgroups to be removed from the pre-event buffer;

remove the selected frame subgroup from the pre-event buffer; and store, in the pre-event buffer, one or more encoded image frames comprised in the obtained stream until the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer;

thereby the device is configured to manage the encoded image frames temporarily stored in the pre-event buffer to be only those encoded image frames constituting a decodable video sequence having the pre-defined pre-event recording time.

9. The device according to claim 8, wherein the selected frame subgroup is captured at a point in time preceding a current point in time minus the pre-defined pre-event recording time.

10. The device according to claim 8, wherein the device comprises a camera, an encoder, or a recorder.

11. A non-transitory computer-readable medium having stored thereon computer code instructions adapted to carry out a method for managing encoded image frames in a pre-event buffer, wherein the encoded image frames depict a scene, the pre-event buffer being configured to temporarily store encoded image frames, which stored encoded image frames, when an event in, or relating to, the scene is detected, constitute a video sequence captured before the event, that, when executed by a device having a processing capability, causes the device to perform the method comprising:

obtaining an input stream of encoded image frames depicting the scene and being arranged in groups of pictures, GOPs, each GOP comprising:

a single intra-frame, and two or more frame subgroups, wherein each frame subgroup comprises:

a single directly encoded inter-frame encoded with a direct reference to the intra-frame, wherein the single directly encoded inter-frame is a P-frame, a fast forward frame or an inter-refresh frame, whereof a fast forward frame or an inter-refresh frame is a forward-predicted inter-frame that refers back to a nearest preceding intra-frame, and one or more indirectly encoded inter-frames encoded with an indirect reference to the single intra-frame via the single directly encoded inter-frame, wherein each of the one or more indirectly encoded inter-frame is a P-frame;

before one or more encoded image frames of the obtained input stream is stored in the pre-event buffer, determining whether or not a total recording time of all encoded image frames stored in the pre-event buffer is equal to a pre-defined pre-event recording time or will become larger than the pre-defined pre-event recording time if one or more encoded image frames of the obtained input stream are stored in the pre-event buffer;

when the total recording time of all encoded image frames stored is not equal to the pre-defined pre-event recording time or will not become larger than the pre-defined pre-event recording time if one or more encoded image frames of the obtained input stream are stored in the pre-event buffer, storing in the pre-event buffer, one or more encoded image frames comprised in the obtained input stream until the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer; and when the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer:

selecting from encoded image frames stored in the pre-event buffer, one frame subgroup out of the two or more frame subgroups to be removed from the pre-event buffer;

removing the selected frame subgroup from the pre-event buffer; and storing, in the pre-event buffer, one or more encoded image frames comprised in the obtained input stream until the total recording time of all encoded image frames stored in the pre-event buffer is equal to the pre-defined pre-event recording time or will become larger than the pre-defined pre-event recording time if one or more encoded image frames of the obtained input stream are stored in the pre-event buffer, thereby managing the encoded image frames temporarily stored in the pre-event buffer to be only those encoded image frames constituting a decodable video sequence having the pre-defined pre-event recording time.

12. The device according to claim 8, wherein the pre-defined pre-event recording time is in the range from a number of seconds to tens of minutes, such as in the range from 5 seconds to 10 minutes.

13. The device according to claim 8, when the selected frame subgroup is at least one out of:

a frame subgroup having a size in bytes that is larger than a size in bytes of any other stored frame subgroup;

a frame subgroup comprising a number of encoded image frames that is larger than a number of encoded image frames of any other stored frame subgroup; or a frame subgroup selected according to a pre-defined pattern.

14. The device according to claim 8, wherein the selected frame subgroup is comprised in a stored GOP captured at a point in time preceding a capturing point in time of any other stored GOP.

15. The device according to claim 14, wherein the selected frame subgroup is captured at a point in time preceding a capturing point in time of any other frame subgroup comprised in the stored GOP.

16. The device according to claim 8, wherein the processor is further configured to:

receive an event indication indicating that an event has been detected;

upon receiving the event indication, retrieve stored encoded image frames from the pre-event buffer, and transmit the retrieved encoded image frames in an output stream of encoded image frames.

\* \* \* \* \*